Jan. 5, 1954 R. J. STEHLING 2,665,161
SECUREMENT FOR HATCH COVERS AND THE LIKE
Filed Dec. 24, 1951
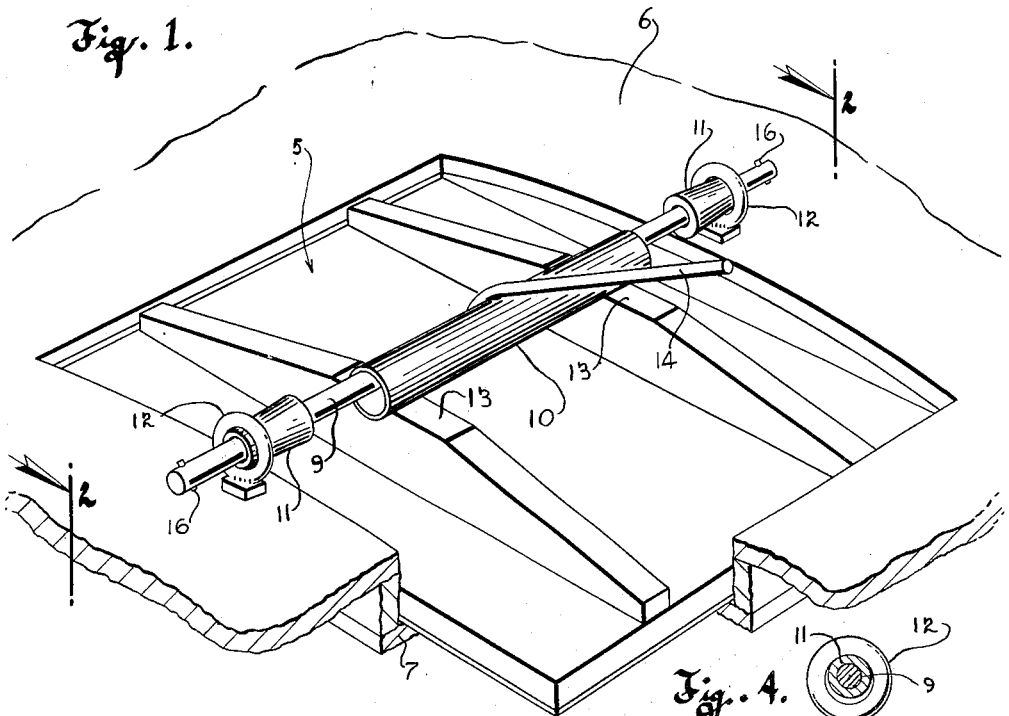
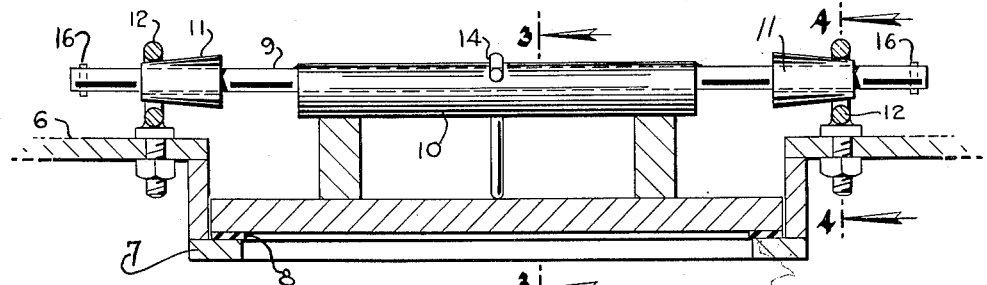
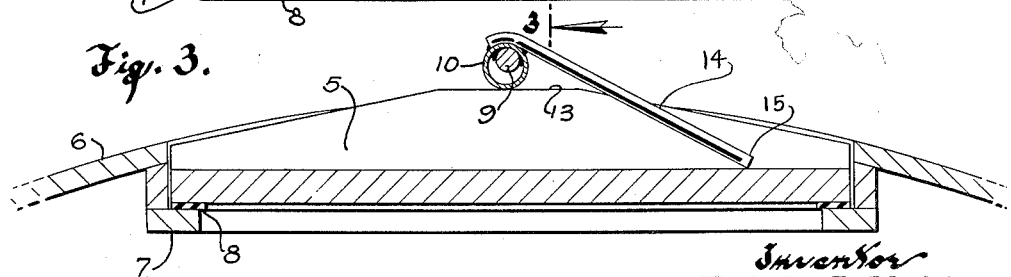
Inventor
Ralph J. Stehling
By
Attorney Patented Jan. 5, 1954

2,665,161

UNITED STATES PATENT OFFICE 2,665,161

SECUREMENT FOR HATCH COVERS AND THE LIKE

Ralph J. Stehling, Milwaukee, Wis., assignor to Chas. H. Stehling Company, Milwaukee, Wis., a corporation of Wisconsin Application December 24, 1951, Serial No. 263,123

7 Claims. (Cl. 292—256.5)

1

This invention relates to securements for covers, hatches and the like and refers more particularly to a securement which will hold a hatch cover in sealing engagement with a gasket surrounding the hatch opening and which provides for secure sealing of the hatch opening even after the gasket is reduced in thickness as a result of frequent use.

In many processes, as for example in some stages of leather tanning, it is necessary to fill a drum or other container with material to be processed and then to tightly seal the hatch opening through which the drum has been filled so that the materials employed in the process cannot leak out around the edges of the hatch or other closure.

One well-known type of securement for this purpose utilizes the wedging effect of an eccentric which is mounted on a rock shaft, the rock shaft being journaled in fixed bearings mounted on opposite sides of the hatch. This type of securement, however, has heretofore had the serious disadvantage of making no allowance for any decrease in the thickness of the gasket or other seal upon which the hatch cover or closure is seated, and consequently the gasket must be replaced when its thickness decreases below the point beyond which the eccentric can no longer effectively wedge the cover firmly down onto it, though the gasket might otherwise be in sound condition. Alternatively, of course, a shim can be interposed between the eccentric and the part of the hatch which it engages, to compensate for the reduced thickness of the gasket, but this expedient is obviously unsatisfactory since such a shim is easily lost, and in any event it must after a time be replaced with a thicker shim to compensate for additional compression of the gasket.

With these objections to past securements of this type in mind, it is an object of this invention to provide a securement of the eccentric type having integral and very simple means for compensating for any change in thickness of the hatch sealing gasket.

Another object of this invention resides in the provision of an eccentric type hatch closing device wherein readily adjustable means are provided for moving the axis of the eccentric toward the hatch to compensate for decreased thickness of the hatch sealing gasket so that the closure will at all times afford a securely sealed closure.

With the above and other objects in view which will appear as the description proceeds, this invention resides in the novel construction, com-

2 bination and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof and in which:

Figure 1 is a perspective view of a hatch about to be secured by means of the device of this invention, the device being shown in its unlocked position;

Figure 2 is a view taken substantially along the plane of the line 2—2 in Figure 1, but with the securement device in locked position;

Figure 3 is a sectional view taken along the plane of the line 3—3 in Figure 2; and Figure 4 is a sectional view taken along the plane of the line 4—4 in Figure 2.

Referring now more particularly to the accompanying drawings in which like numerals designate like parts throughout the several views, the numeral 5 designates generally a hatch or cover closing an aperture in a relatively fixed wall 6 of a container. The hatch cover is seated on a ledge or shoulder 7 which is recessed in the wall of the container and which extends around the opening therein, and a resilient gasket 8 is interposed between the shoulder and the hatch cover to provide a good seal against leakage of the contents of the container when the cover is firmly forced down toward the shoulder.

The closing device of this invention comprises a rock shaft 9 having an eccentric 10 secured thereon, the rock shaft being rotatably journaled in axially slidable conical bushings 11 which are in turn supported in ring bolts 12 mounted on the wall of the container at opposite sides of the opening with their rings coaxial. The rock shaft is preferably made of ordinary rod stock and the eccentric 10 is readily fabricated by welding to the rod a piece of pipe or tubing having an inside diameter substantially greater than the diameter of the rock shaft so that the tubing will be eccentrically disposed with respect to the rod, as best seen in Figure 3. In its locked position the eccentric firmly engages the outer surface of ribs 13 on the cover, and it will be seen that rotation of the eccentric about the axis of the rock shaft can exert a powerful wedging action upon the ribs to thus seat the hatch cover in firm sealing engagement with the gasket. Locking and unlocking rotation of the eccentric is facilitated by a handle 14 extending transversely from the eccentric and so disposed that the free end 15 of the handle engages the outer surface of the hatch when the eccentric is in its locked position (illustrated in Figure 3), wherein it is rotated slightly past dead center to prevent its being wedged back open by the expansion force of the gasket.

The bushings 11 are freely slidable axially along the rod and to prevent their slipping off the ends of the rod when the device is being attached to and removed from the container transverse stop pins 16 or other abutments are secured at the ends of the rod after the bushings are installed thereon. The rings of the ring bolts provide bearings in which the bushings, and hence the entire lock bolt assembly comprising the rod and its appurtenances, are mounted.

The bushings are conical or, more accurately, frusto-conical, tapering axially outwardly, and their narrow ends are substantially smaller in diameter than the eyes of the ring bolts in which they are received. Consequently, when the gasket is new and relatively thick the bushings need be slid out along the rod only to the point where their small diameter or narrow ends just enter the ring bolts. As the gasket decreases in thickness with increasing use, the bushings will be slid farther out on the shaft, and since the bushings engage the bearing surfaces of the ring bolts only along their upper surfaces the tapering profile of the bushings will carry the axis of the rock shaft downwardly, thereby compensating for the decreased thickness of the gasket.

Installation and removal of the closing device are in nowise hampered by the employment of the conical bushings of this invention. After the hatch cover is set in place on the gasket the rock shaft assembly, with the bushings held in their axially innermost position abutting the eccentric, is readily insertable into first one ring bolt and then the other, after which the bushings are slid outwardly until they enter the ring bolt bearings a distance proportional to the amount of compression desired and the relative thickness of the gasket. The handle 14 is then moved downwardly, rotating the rock shaft in the bushings and thereby rotating the eccentric 10 to wedge the cover down onto the gasket, as above described, to the locked position of the lock bolt. Removal of the cover merely entails a reversal of this procedure.

From the foregoing description, taken together with the accompanying drawing, it will be readily apparent that this invention provides an eccentric type of securement device for hatches, covers and the like in which simple integral means are provided for readily compensating for variations in the thickness of the cover gasket.

What I claim as my invention is:

1. A securement for hatch covers and the like comprising: a pair of bearings adapted to be mounted coaxially on opposite sides of a hatch; a rock shaft long enough to extend across the hatch and through both of said bearings and having a diameter substantially less than the diameter of the bearing apertures; an eccentric fixed on the rock shaft and engageable with a part on the hatch cover to be closed upon rotation of the rock shaft about its axis; and a conical bushing axially slidably mounted on each end of the rock shaft and journaling the same, each of said bushings being adapted to be received in one of the bearings and tapering axially outwardly with its narrow end smaller in diameter than the bearing aperture so that adjustment of the bushings axially inwardly and outwardly on the rock shaft, farther into and out of the bearings, will move the axis of the rock shaft toward and from the bearing axis.

2. A securement for hatch covers and the like comprising: a pair of ring-like bearings each having a base by which the bearings are adapted to be mounted coaxially on opposite sides of a hatch; an eccentric; and means mounting the eccentric in the bearings for rotation about an axis which is adjustably movable toward and from the bearing bases, so as to assure secure closure of the hatch cover despite variations of its position with respect to the bearing bases, said means comprising a pair of conical bushings, each receivable in one of the bearings and having its narrow end smaller in diameter than the inside diameter of the bearing in which it is adapted to be received, and means mounting the eccentric in the bushings and permitting the bushings to be slidable axially toward and from one another so as to enable adjustment of the axial positions of the bushings in the bearings to thereby effect adjustment of the position of the eccentric axis with respect to the bearing bases.

3. A hatch cover securement of the type wherein an eccentric is journaled in fixed bearings on opposite sides of a hatch and is adapted to be rotated into firm securing engagement with a part on the hatch cover to wedge the cover tightly shut, characterized by the fact that the eccentric is mounted in conical bushings positionable in the bearings, the small ends of said bushings having a diameter substantially smaller than the inside diameter of the bearings, said bushings being axially slidable with respect to one another to enable axial adjustment of the bushings in the bearings whereby the tapering profile of the bushings cooperates with the bearings to shift the eccentric axis toward and from the cover.

4. A securement for a hatch cover or the like comprising: a pair of ring bolts mounted on opposite sides of a hatch to be closed, with their rings coaxial; a rock shaft long enough to pass through both ring bolts; a length of tubing substantially shorter than the rock shaft, eccentrically secured thereto; a pair of frusto-conical bushings slidably mounted on the ends of the rock shaft and receivable in the ring bolts and rotatably journaling the rock shaft, said bushings tapering axially outwardly and having a substantially smaller diameter at their narrow ends than the inside diameter of the ring bolts so that axial adjustment of the bushings in the ring bolts effects displacement of the rock shaft axis with respect to the axis of the ring bolt rings; and means for rotating the rock shaft to engage the eccentric with a part on the hatch cover and wedge the cover firmly onto its seat.

5. As an article of manufacture, a securement bolt for a hatch cover or the like comprising: a shaft; a length of tubing eccentrically mounted on the medial portion of said shaft; a pair of frusto-conical bushings slidably mounted on the end portions of said shaft and adapted to be received in bearings fixed on a wall, at opposite sides of an aperture in said wall, and to cooperate with said bearings to carry the axis of the shaft toward and from said wall in consequence of axial adjustment of said bushings farther into and out of said bearings; and abutments at the ends of the shaft precluding axially outward displacement of the bushings off of the shaft.

6. In a container having a fixed wall with an aperture therein: a ledge on said wall extending around the aperture; a hatch cover for said aperture adapted to be seated on said ledge to close the aperture; a pair of ring bolts mounted on the fixed wall at opposite sides of the aperture with their rings coaxial; a rock shaft long enough to pass through both ring bolts; a pair of frusto-conical bushings slidably mounted on the ends of the rock shaft and receivable in the ring bolts, said bushings tapering axially outwardly and being substantially smaller in diameter at their outer ends than the inside diameter of the ring bolts so that axial adjustment of the bushings in the ring bolts effects displacement of the rock shaft toward and from said hatch cover; abutments at the ends of the rock shaft against which the bushings engage to preclude displacement of the bushings off of the rock shaft; an eccentric secured to the medial portion of the rock shaft and having one of its ends spaced axially inwardly from the corresponding end of the rock shaft sufficiently far enough to enable withdrawal of the other end of the rock shaft laterally from its ring bolt when the bushing at said one end of the rock shaft is displaced axially inwardly on the rock shaft to abut the eccentric, and means for rotating the rock shaft when the bushings are received in the bearings to engage the eccentric with a part on the hatch cover and thus wedge the cover firmly onto the ledge.

7. A securement for hatch covers and the like comprising: a fixed wall having a hatch aperture therein adapted to be closed by a cover; a shaft having a length sufficient to span said aperture with its end portions extending over the fixed wall at opposite sides of the aperture and having an eccentric intermediate its ends engageable with a part on a hatch cover; and means mounting the shaft for rotation about an axis which is adjustably movable toward and from said fixed wall, said means comprising relatively fixed and axially movable elements at each end portion of the shaft, one of said elements being mounted on the fixed wall and the other being on the shaft, and one of said elements having a surface which is tapered axially and cooperable with a surface on the other element to cam the eccentric toward and from the fixed wall upon relative axial movement of said axially movable element with respect to said other element.

RALPH J. STEHLING.

References Cited in the file of this patent

FOREIGN PATENTS

| Number | Country | Date |
|--------|---------|------|
| 18,766 | Austria | Jan. 10, 1905 |
| 700,444 | France | Dec. 23, 1930 |